Patented May 5, 1925.

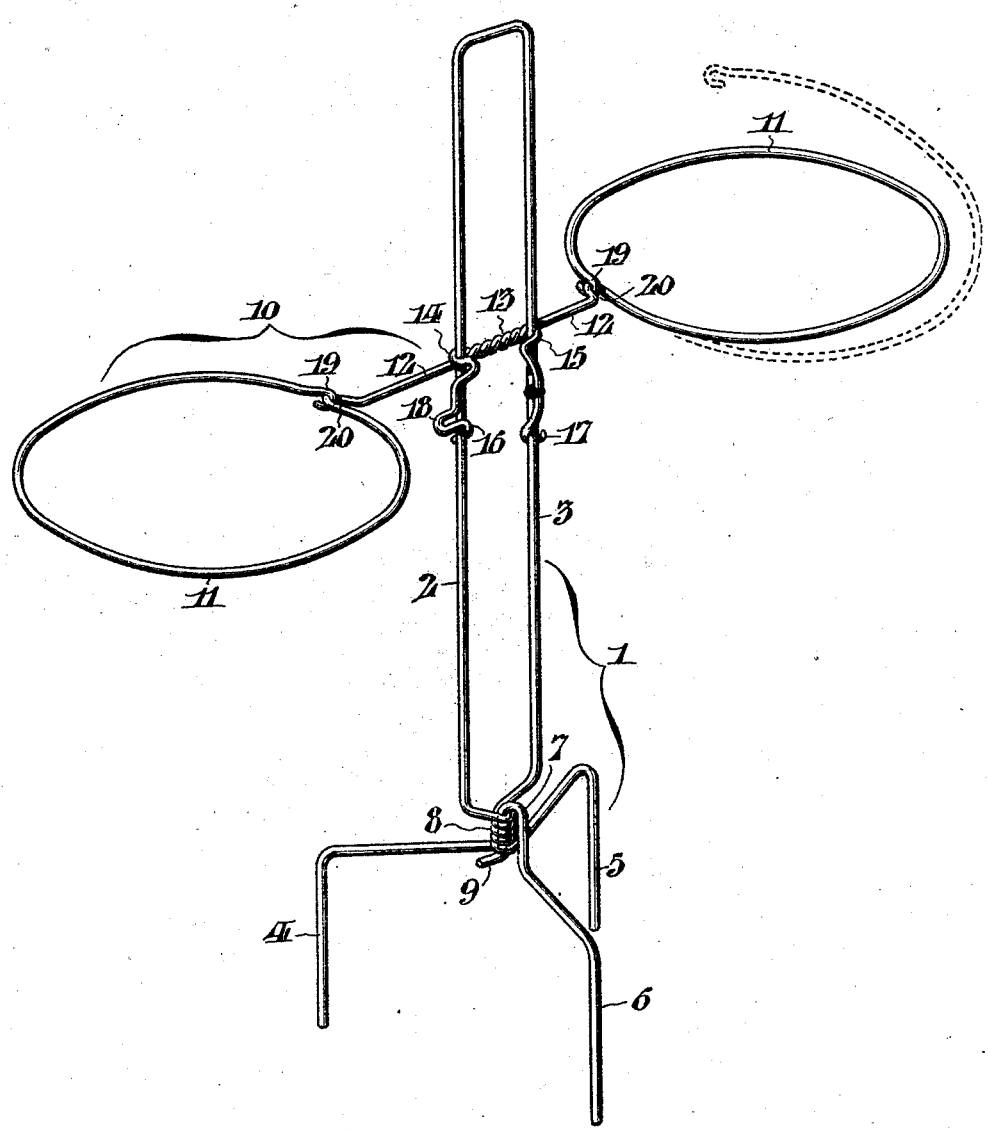

1,536,678

UNITED STATES PATENT OFFICE.

ANTHONY MARKOWSKI, OF CHESTNUT HILL, PENNSYLVANIA.

PLANT SUPPORT.

Application filed August 24, 1923. Serial No. 659,031.

*To all whom it may concern:*

Be it known that I, ANTHONY MARKOWSKI, a citizen of Soviet Russia, residing at Chestnut Hill, county of Montgomery, and State of Pennsylvania, have invented certain new and useful Improvements in Plant Supports, whereof the following is a specification, reference being had to the accompanying drawings.

My invention relates generally to means useful in supporting or bracing plants, and more specifically to a type adapted to brace several plants at a time. The object of my invention is to provide a plant support of the character specified capable of being economically manufactured of wire, and its constituent parts so constructed as to be readily detachable for convenience of packing as well as readily adjustable in use to accommodate growth of the plants.

In the drawing herewith I have shown in perspective a plant support conveniently embodying my invention.

As illustrated, the plant support comprises a standard comprehensively designated by the numeral 1, and a separate detachable plant engaging member 10 adapted for adjustment vertically of said standard.

Confining attention for the time being to the standard 1, it will be noted that the same consists of two parts or components, each fashioned from a single strand of stout wire. The main component of the standard 1 affords an upright or stem with parallel vertical bars 2, 3 suitably spaced apart to lend the necessary rigidity to the structure, and a pair of offset legs 4, 5 preferably separated by an obtuse angle—as shown. The other component affords a third offset leg 6 which in company with the legs 4, 5 provides a tripod base for the standard. The latter component may be secured to its companion in any approved manner, for example, by formation therein of a retroverted bend 7 with one side thereof pivotally embraced in a coil or twist 8 in the wire of the main component and the protruding end laterally turned as at 9 for retainment. This construction has the advantage of permitting collapse of the standard so as to occupy a minimum space for convenience from the standpoint of packing. In setting up the standard, the leg 6 is first swung to a central position between its fellows 4, 5 and the group then well embedded in the soil. The stem constituted by the rods 2, 3 is thus maintained firmly in the desired upright position.

The associated multi-plant engaging member 10 comprises two split rings or hoops 11, 11 each formed from a single strand of springy wire and each provided with an integral laterally extending sustaining shank 12. In the course of manufacture, these shanks 12 are brought into alignment with their extremities overlapping, and thereafter rigidly secured together preferably as herein shown by twisting as at 13 thus jointly constituting a straight connecting cross bar between the two hoops 11. The twisting is so ordered as to comprehend an extent equal substantially to the distance between the rods 2, 3 of the standard 1, and at the same time to reserve a substantial length of each strand of wire beyond the region of juncture of the shanks. Immediately at the points of emergence from the twist 13, the protruding wire ends are bent to provide constricted friction loops 14, 15 for individually engaging the rods 2, 3 of the standard, and attention is directed to the fact that the approaches to these loops face each other. At the terminals of the wire ends are formed additional or auxiliary constricted friction loops 16, 17 which are respectively vertically aligned with the loops 14, 15 aforedescribed and cooperate with them so that the rods 2, 3 are engaged in different planes and the plant supporting member 10 thus stabilized against tilting as well as more effectively held against accidental slippage. The auxiliary loops 16, 17 though similar to the main friction loops 14, 15, are relatively reversed in position, in other words, their approaches are opposed or in a direction away from one another. The reason for this distinction will become manifest from further description. As a means for facilitating removal of the member 10 from the standard 1, I provide one of the looped wire ends with a finger projection or grasp as by lateral retroversion of the wire directly above the auxiliary loop as indicated at 18. Closure of the plant engaging rings or hoops 11 is maintained in opposition to the springiness of the wire through provision of terminal hooks 19 designed to detachably engage bent off-sets or recessions 20 formed at the junctures of the hoops and their sustaining shanks. Release of a hook 19 is attended by automatic expansion of the corresponding ring 11 as shown in dotted lines in the illustration so that a plant may be readily encompassed without necessitating removal of the member 10 from the standard.

When it is desired to remove the member 10 from the standard 1, this may be accomplished by grasping the finger projection 18 to first release the auxiliary hook 16. Then by slight flexure of the rod 2 of the standard 1 the same is disengaged from the friction loop 14 whereupon the member 10 can be bodily swung slightly about the upright rod 3 until the rod 2 is entirely freed and then tilted to disengage the friction loops 17, 15 in the order indicated. Mounting of the member 10 may of course be as readily accomplished by procedure conversely to that just described without disturbing the position of the standard 1 after the latter has once been placed.

Having thus described my invention, I claim:

1. A plant support comprising a doubled-wire standard embodying vertically parallel rods with the free ends coiled together and offset to provide a pair of legs, a third offset leg pivoted in the coiled portion aforesaid, and an associated plant engaging means embracing two hoops each fashioned from a single strand of wire and each provided with an integral sustaining shank, said shanks being aligned and twisted together centrally of the member to an extent conforming with the space intervening between the aforesaid parallel rods, with the ends of the wires projecting beyond the region of the juncture bent to afford, adjacent said juncture, a pair of main friction loops with their approaches facing each other, and at their terminals with a pair of auxiliary friction loops aligned with the former but with their approaches facing in a direction from one another, said coordinated pairs of friction loops being adapted to engage respectively with the parallel bars of the standard.

2. A plant support comprising a doubled-wire standard embodying vertically parallel rods with the free ends coiled together and offset to provide a pair of legs, a third offset leg pivoted in the coiled portion aforesaid, and an associated plant engaging means embracing a pair of opposed hoops split at points in their circumferences to facilitate application about plants, each said hoop being fashioned from a single strand of wire and provided with an integral sustaining shank, said shanks being aligned and twisted together centrally to an extent conforming with the space intervening between the aforesaid parallel rods, with the ends of the wire projecting beyond the region of the juncture bent to afford, adjacent said juncture, a pair of main friction loops, with their approaches facing each other, and at their terminals with laterally retroverted finger grasps and auxiliary friction loops aligned with the former loops but with their approaches facing in a reverse direction, said coordinated pairs of friction loops being adapted to engage respectively with the parallel bars of the standard.

In testimony whereof, I have hereunto signed my name at Philadelphia, Pennsylvania, this 6th day of August, 1923.

ANTHONY MARKOWSKI.

Witnesses:
 JAMES H. BELL,
 LOUISE SCHIEFFER.